United States Patent
Fujii et al.

(10) Patent No.: US 12,110,424 B2
(45) Date of Patent: Oct. 8, 2024

(54) POLYPROPYLENE-BASED ADHESIVE AND METHOD FOR PRODUCING SAME

(71) Applicant: IDEMITSU KOSAN CO.,LTD., Chiyoda-ku (JP)

(72) Inventors: Nozomu Fujii, Sumida-ku (JP); Masami Kanamaru, Chiba (JP); Takuji Okamoto, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 760 days.

(21) Appl. No.: 17/264,619

(22) PCT Filed: Jul. 31, 2019

(86) PCT No.: PCT/JP2019/030070
§ 371 (c)(1),
(2) Date: Jan. 29, 2021

(87) PCT Pub. No.: WO2020/027222
PCT Pub. Date: Feb. 6, 2020

(65) Prior Publication Data
US 2021/0292610 A1    Sep. 23, 2021

(30) Foreign Application Priority Data
Aug. 2, 2018   (JP) .................................. 2018-146091

(51) Int. Cl.
| C09J 123/12 | (2006.01) |
| C08K 5/01 | (2006.01) |
| C08K 5/14 | (2006.01) |
| C09J 191/06 | (2006.01) |

(52) U.S. Cl.
CPC .............. *C09J 123/12* (2013.01); *C08K 5/01* (2013.01); *C08K 5/14* (2013.01); *C09J 191/06* (2013.01); *C09J 2301/162* (2020.08); *C09J 2301/30* (2020.08); *Y10T 442/20* (2015.04)

(58) Field of Classification Search
CPC ..... C08L 91/00; C09J 123/12; C09J 2301/30; C09J 2301/60; Y10T 442/20; C08K 5/01; C08K 5/14; C08J 191/06; C08F 110/06; C08F 8/50
USPC ......................................................... 442/59
See application file for complete search history.

(56) References Cited

U.S. PATENT DOCUMENTS

| 2012/0016086 A1 | 1/2012 | Kasper et al. |
| 2013/0066007 A1 | 3/2013 | Machida et al. |
| 2013/0186566 A1 | 7/2013 | Lotz et al. |
| 2013/0203900 A1 | 8/2013 | Ellis et al. |
| 2014/0235127 A1 | 8/2014 | Dejesus et al. |
| 2015/0225611 A1 | 8/2015 | Ellis et al. |
| 2015/0275054 A1 | 10/2015 | Minami et al. |
| 2017/0283603 A1* | 10/2017 | Austin ............... C09J 7/243 |
| 2017/0283668 A1 | 10/2017 | Ellis et al. |

FOREIGN PATENT DOCUMENTS

| JP | 2003-40921 A | 2/2003 | |
| JP | WO2008/047860 A1 | 4/2008 | |
| JP | 2013-249459 A | 12/2013 | |
| JP | 2016-514176 A | 5/2016 | |
| JP | 2016084410 * | 5/2016 | ............. B65D 65/40 |
| WO | WO 2011/148586 A1 | 12/2011 | |
| WO | WO-2013183611 A1 * | 12/2013 | ............. C08F 10/04 |
| WO | WO 2014/069606 A1 | 5/2014 | |
| WO | WO-2017018461 A1 * | 2/2017 | ............. B29C 55/04 |

OTHER PUBLICATIONS

Extended European Search Report issued Mar. 9, 2022 in European Patent Application No. 19844308.7, citing documents AA-AD therein, 9 pages.
Combined Chinese Office Action and Search Report issued Mar. 11, 2022 in Patent Application No. 201980050892.7 (with English translation of Category of Cited Documents), citing document AE therein, 9 pages.
Chinese Office Action issued Aug. 2, 2022 in Chinese Patent Application No. 201980050892.7, 5 pages.
Notice of Reasons for Refusal issued Mar. 28, 2023 in Japanese Patent Application No. 2020-534720 (with English machine translation), 7 pages.
International Search Report issued on Nov. 5, 2019 in PCT/JP2019/030070 filed on Jul. 31, 2019, citing references AA-AC and AO-AS therein, 2 pages.
European Office Action issued Sep. 11, 2023 in European Application 19844308.7, 8 pages.

* cited by examiner

*Primary Examiner* — Camie S Thompson
(74) *Attorney, Agent, or Firm* — Oblon, McClelland, Maier & Neustadt, L.L.P.

(57) ABSTRACT

A polypropylene-based adhesive containing a polypropylene-based resin (A') prepared by reducing the weight-average molecular weight of a polypropylene-based resin (A) by decomposition, in which the melting endotherm (ΔH-D) of the polypropylene-based resin (A) is 0 J/g or more and 80 J/g or less, as obtained from a melting endothermic curve drawn by holding a sample at −10° C. for 5 minutes in a nitrogen atmosphere followed by heating it at 10° C./min using a differential scanning calorimeter (DSC).

12 Claims, No Drawings

POLYPROPYLENE-BASED ADHESIVE AND METHOD FOR PRODUCING SAME

TECHNICAL FIELD

The present invention relates to a polypropylene-based adhesive and a method for producing it.

BACKGROUND ART

A polyolefin-based adhesive is excellent in mechanical strength and workability and extremely useful in the balance with economic performance, and is therefore widely used in various fields. Recently, however, from the viewpoint of improving productivity, further improvement of coating performance is desired, and various attempts to modify a polypropylene-based resin that is a main material for adhesives is being made.

For example, PTL 1 discloses a high-purity olefinic polymer, in which the catalyst residue is small and which has a high terminal unsaturation degree and is therefore favorable as a reactive precursor, and a method for efficiently producing it.

CITATION LIST

Patent Literature

PTL 1: WO2008/047860

SUMMARY OF INVENTION

Technical Problem

However, though a reactive precursor for efficiently producing a modified polymer can be obtained according to the technique described in PTL, the technique is still insufficient in point of improving the coating performance of a polypropylene-based adhesive.

Accordingly, an object of the present invention is to provide a polypropylene-based adhesive having good coating performance.

Solution to Problem

The disclosure of the present application relates to the following:

<1> A polypropylene-based adhesive containing a polypropylene-based resin (A') prepared by reducing the weight-average molecular weight of a polypropylene-based resin (A) by decomposition, in which the melting endotherm (ΔH-D) of the polypropylene-based resin (A) is 0 J/g or more and 80 J/g or less, as obtained from a melting endothermic curve drawn by holding a sample at −10° C. for 5 minutes in a nitrogen atmosphere followed by heating it at 10° C./min using a differential scanning calorimeter (DSC).
<2> The polypropylene-based adhesive according to the above <1>, wherein the number of the vinylidene group as a terminal unsaturated group contained per molecule of the polypropylene-based resin (A') is 0.9 or more and 2.0 or less.
<3> The polypropylene-based adhesive according to the above <1> or <2>, wherein the weight-average molecular weight (Mw) of the polypropylene-based resin (A) is 150,000 or less.
<4> The polypropylene-based adhesive according to any one of the above <1> to <3>, wherein the viscosity of the polypropylene-based resin (A) is 400,000 mPa·s or less, as measured with a B-type viscometer.
<5> The polypropylene-based adhesive according to any one of the above <1> to <4>, wherein the molecular weight distribution (Mw/Mn) of the polypropylene-based resin (A) is 4.0 or less.
<6> The polypropylene-based adhesive according to any one of the above <1> to <5>, wherein the polypropylene-based resin (A) is a propylene homopolymer.
<7> The polypropylene-based adhesive according to any one of the above <1> to <6>, further containing a radical generator (B) in an amount of 0.01 parts by mass or more and 5 parts by mass or less relative to 100 parts by mass of the polypropylene-based resin (A).
<8> The polypropylene-based adhesive according to any one of the above <1> to <7>, further containing a tackifier resin (C) in an amount of 0 part by mass or more and 400 parts by mass or less relative to 100 parts by mass of the polypropylene-based resin (A).
<9> The polypropylene-based adhesive according to any one of the above <1> to <8>, further containing an oil (D) in an amount of 0 part by mass or more and 100 parts by mass or less relative to 100 parts by mass of the polypropylene-based resin (A).
<10> The polypropylene-based adhesive according to any one of the above <1> to <9>, further containing a wax (E) in an amount of 0 part by mass or more and 50 parts by mass or less relative to 100 parts by mass of the polypropylene-based resin (A).
<11> A laminate containing the polypropylene-based adhesive of any one of the above <1> to <10>.
<12> A nonwoven fabric containing the polypropylene-based adhesive of any one of the above <1> to <10>.
<13> A method for producing a polypropylene-based adhesive, including a step of producing a polypropylene-based resin (A') by reducing the weight-average molecular weight of a polypropylene-based resin (A) by decomposing the polypropylene-based resin (A) in the presence of a radical generator (B), in which the melting endotherm (ΔHm-D) of the polypropylene-based resin (A) is 0 J/g or more and 80 J/g or less, as obtained from a melting endothermic curve drawn by holding a sample at −10° C. for 5 minutes in a nitrogen atmosphere followed by heating it at 10° C./min using a differential scanning calorimeter (DSC).
<14> The method for producing a polypropylene-based adhesive according to the above <13>, wherein the method of reducing the weight-average molecular weight of the polypropylene-based resin (A) is at least one method selected from addition of a radical generator (B), heating and irradiation with radiation.

Advantageous Effects of Invention

According to the present invention, there can be provided a polypropylene-based adhesive having good coating performance.

DESCRIPTION OF EMBODIMENTS

The present invention is described in detail hereinunder. In this description, the numerical range expressed by the wording "a number A to another number B" means a range of "A or more and B or less" (in the case of A<B), or a range of "A or less and B or more" (in the case of A>B). Also in this description, a combination of preferred embodiments is a more preferred embodiment.

<Polypropylene-Based Resin (A)>

The polypropylene-based resin (A) for use in this embodiment is a polypropylene-based resin that has a melting endotherm (ΔH-D) of 0 J/g or more and 80 J/g or less, as obtained from a melting endothermic curve drawn by holding a sample at −10° C. for 5 minutes in a nitrogen atmosphere followed by heating it at 10° C./min using a differential scanning calorimeter (DSC).

The melting endotherm (ΔH-D) more than 80 J/g is problematic from the viewpoint of flexibility. From the foregoing viewpoint, the melting endotherm (ΔH-D) is preferably 70 J/g or less, more preferably 60 J/g or less, even more preferably 50 J/g or less, and is, from the viewpoint of preventing stickiness, preferably 5 J/g or more, more preferably 10 J/g or more, even more preferably 15 J/g or more.

The melting endotherm (ΔH-D) is determined by calculating the area surrounded by a line portion that contains a peak observed on the highest temperature side in the melting endothermic curve drawn in DSC, and a baseline drawn by connecting a point on a low-temperature side where no change of the quantity of heat is present with a point on a high-temperature side where no change of the quantity of heat is present.

The melting endotherm (ΔH-D) can be controlled by appropriately controlling monomer concentration and reaction pressure.

The polypropylene-based resin (A) may be a propylene homopolymer, or may also be a copolymer, but is, from the viewpoint of heat stability and solidification speed, more preferably a propylene homopolymer. The term "polypropylene" in the present invention includes not only a propylene homopolymer but also a propylene-olefin random copolymer and a propylene-olefin block copolymer containing any other olefin unit than the propylene unit in an amount of 50% by mass or less in the polymer.

In the case where the polypropylene-based resin (A) is a copolymer, the copolymerization ratio of the propylene unit is more than 50 mol %, preferably 60 mol % or more, more preferably 70 mol % or more, even more preferably 90 mol % or more, further more preferably 95 mol % or more. The copolymerizable monomer is at least one selected from the group consisting of ethylene and an α-olefin having 4 to 30 carbon atoms, and specific examples thereof include a linear olefin such as ethylene, 1-butene, 1-pentene, 1-hexene, 1-heptene, 1-octene, and 1-decene, and a branched olefin such as isobutene, and 4-methyl-1-pentene. In the case where the polypropylene-based resin (A) is a copolymer, preferably, the polypropylene-based resin (A) contains at least one structural unit selected from the group consisting of ethylene and an α-olefin having 4 to 30 carbon atoms, in a ratio of more than 0 mol % and 20 mol % or less.

Preferably, from the viewpoint of flexibility, the polypropylene-based resin (A) does not exhibit a melting point (Tm-D), which is defined as a peak top observed on the highest temperature side in a melting endothermic curve drawn by holding a sample at −10° C. for 5 minutes in a nitrogen atmosphere followed by heating it at 10° C./min using a differential scanning calorimeter (DSC), or has a melting point (Tm-D) of 0° C. or higher and 120° C. or lower. The melting point of the resin having such a melting point is more preferably 20° C. or higher, even more preferably 30° C. or higher, still more preferably 40° C. or higher, and is preferably 100° C. or lower, more preferably 110° C. or lower. The melting point can be controlled by appropriately controlling monomer concentration and reaction pressure.

The weight-average molecular weight (Mw) of the polypropylene-based resin (A) is, from the viewpoint of the balance between fluidity and material strength, preferably 20,000 or more, more preferably 25,000 or more, even more preferably 30,000 or more, and is preferably 150,000 or less, more preferably 90,000 or less, even more preferably 60,000 or less, further more preferably 55,000 or less, further more preferably 50,000 or less.

The molecular weight distribution (Mw/Mn) of the polypropylene-based resin (A) is, from the viewpoint of coating performance, preferably 4.0 or less, more preferably 3.0 or less, even more preferably 2.8 or less, further more preferably 2.6 or less, further more preferably 2.5 or less, and is preferably 1.5 or more, more preferably 1.6 or more, even more preferably 1.7 or more, further more preferably 1.8 or more.

The weight-average molecular weight (Mw) and the molecular weight distribution (Mw/Mn) can be determined through gel permeation chromatography (GPC). The weight-average molecular weight is a polystyrene-equivalent weight-average molecular weight measured with the following apparatus under the following condition, and the molecular weight distribution is a value calculated from the number-average molecular weight (Mn) measured in the same manner and the above-mentioned weight-average molecular weight (Mw). The monomer-average molecular weight (M) to be mentioned hereinunder is measured also in the same manner.

<GPC Measurement Apparatus>

Column: "TOSO GMHHR-H(S)HT" by Tosoh Corporation

Detector: RI Detector for Liquid Chromatography, "WATERS 150C" by Waters Corporation <Measurement Condition>

Solvent: 1,2,4-Trichlorobenzene

Measurement Temperature: 145° C.

Flow Rate: 1.0 mL/min

Sample Concentration: 5 mg/10 mL

Injection Amount: 300 μL

Calibration Curve: Universal Calibration

Analysis Software: HT-GPC (Ver. 1.0)

The viscosity of the polypropylene-based resin (A), as measured with a B-type viscometer at 190° C., is, from the viewpoint of coating performance, preferably 1,500 mPa·s or more, more preferably 5,000 mPa·s or more, even more preferably 7,500 mPa·s or more, further more preferably 8,000 mPa·s or more, and is preferably 400,000 mPa·s or less, more preferably 75,000 mPa·s or less, even more preferably 10,000 mPa·s or less, further more preferably 9,000 mPa·s or less. The viscosity of the polypropylene-based resin (A) at 190° C. is measured according to ASTM D3236, using a Brookfield rotary viscometer at 190° C.

Commercial products can be used as the polypropylene-based resin (A). Specific examples thereof include "S400", "S410", "S401", "S600", and "S901" of "L-MODU" (registered trademark) (by Idemitsu Kosan Co., Ltd.). Commercial products of amorphous poly-α-olefins include "REXtac" by REXtac, LLC, "Vestoplast" by Evonik Corporation, and "Eastoflex" and "Aerafin" by Eastman Corporation. Commercial products of propylene-based elastomers include "Tafmer XM", "Taffmer PN" and "Tafmer SN" by Mitsui Chemicals Inc.; "Toughcellen" by Sumitomo Chemical Co., Ltd.; "Prime TPO" by Prime Polymer Corporation; "Versify" by Dow Chemical Corporation; "Vistamaxx" and "Linxar" by Exxon Mobile Corporation; "Licocene" by Clariant Corporation; and "Adflex" by LyondellBasell Industries NV (all trade names).

The polypropylene-based resin (A) can be produced by polymerizing a monomer in the presence of a polymerization catalyst such as a Ziegler-Natta catalyst, a metallocene catalyst. Above all, the polypropylene-based resin (A) is preferably a polypropylene-based resin obtained using a metallocene catalyst. A metallocene catalyst is a type of homogeneous catalyst, and the polymer obtained using it can be a homogeneous polymer having a narrow molecular weight distribution and a narrow composition distribution. When a polypropylene-based resin obtained using a metallocene catalyst is used, homogeneous reaction with a radical generator (B) can occur to give a homogeneous product with ease.

The polypropylene-based resin (A) need not be a single component, and two or more kinds of polypropylene-based resin (A) can be used as combined. Further, within a range not contrary to the object of the present invention, a polyolefin resin such as a polyethylene-based resin and a polybutene-based resin as well as any other thermoplastic resin can also be mixed.

<Polypropylene-Based Resin (A')>

The polypropylene-based adhesive of this embodiment contains a polypropylene-based resin (A') prepared by reducing the weight-average molecular weight of the polypropylene-based resin (A) by decomposition.

The number of the vinylidene group as a terminal unsaturated group (terminal vinylidene group) contained per molecule of the polypropylene-based resin (A') is, from the viewpoint of coating performance, preferably 0.9 or more, more preferably 1.0 or more, and is preferably 2.0 or less, more preferably 1.75 or less, even more preferably 1.5 or less.

The number of the terminal vinylidene group per molecule can be determined through $^1$H-NMR measurement according to an ordinary method.

In the method, all the terminal group species are determined, and further the amount thereof is measured. From the abundance ratio of the terminal vinylidene group to all the terminal group, the number of the terminal vinylidene group per molecule can be determined.

Specifically, based on the terminal vinylidene group appearing at $\delta$4.8 to 4.6 (2H) in $^1$H-NMR measurement, the content of the terminal vinylidene group (C) (mol %) is calculated according to an ordinary method. Further, from the number-average molecular weight (Mn) and the monomer molecular weight (M) determined through gel permeation chromatography (GPC), the number of the terminal vinylidene group per molecule is calculated according to the following expression.

Number of terminal vinylidene group per molecule= (Mn/M)×(C/100)

Referring to a case of a propylene polymer as an example, a method of calculating the content of the terminal vinylidene group (C) (mol %) in the polymer is described below.

A propylene polymer gives <1> a methylene group of the terminal vinyl group (5.10 to 4.90 ppm), <2> a methylene group of the terminal vinylidene group (4.8 to 4.6 ppm) and <3> methine, methylene and methyl groups of the propylene chain (0.6 to 2.3 ppm). The content of the terminal vinylidene group (C) (mol %) is calculated according to the following expression.

Content of terminal vinylidene group (C) (mol %)= (<2>/2)/[(<3>+4×<1>/2+3×<2>/2)/6]×100

<Radical Generator (B)>

The polypropylene-based adhesive of this embodiment preferably contains a radical generator (B) for reducing the weight-average molecular weight of the polypropylene-based resin (A) by decomposition. From the viewpoint of productivity, preferably, at least one selected from a peroxide and a hydroxylamine derivative is contained as the radical generator (B).

The peroxide can be appropriately selected from already-known radical generators, for example, various organic peroxides, and azo compounds such as azobisisobutyronitrile and azobisisovaleronitrile. Among these, organic peroxides are preferred.

Examples of the organic peroxides include diacyl peroxides such as dibenzoyl peroxide, di-(3,5,5-trimethylhexanoyl) peroxide, dilauroyl peroxide, didecanoyl peroxide, and di(2,4-dichlorobenzoyl) peroxide; hydroperoxides such as t-butylhydroperoxide, cumene hydroperoxide, diisopropylbenzene hydroperoxide, and 2,5-dimethylhexane-2,5-dihydroperoxide; dialkyl peroxides such as di-t-butyl peroxide, dicumyl peroxide, 2,5-dimethyl-2,5-di-(t-butylperoxy)hexane, 2,5-dimethyl-2,5-di(t-butylperoxy)hexyne-3, α,α'-bis(t-butylperoxy)diisopropylbenzene, and 3,6,9-triethyl-3,6,9-trimethyl-1,4,7-triperoxonane; peroxyketals such as 1,1-bis(t-butylperoxy)-3,3,5-trimethylcyclohexane, and 2,2-bis(t-butylperoxy)butane; alkyl peresters such as t-butylperoxy octoate, t-butylperoxy pivalate, t-butylperoxy neodecanoate, and t-butylperoxy benzoate; and peroxycarbonates such as di(2-ethylhexyl)peroxy dicarbonate, diisopropylperoxy dicarbonate, bis(4-t-butylcyclohexyl)peroxy dicarbonate, di-sec-butylperoxy dicarbonate, and t-butylperoxyisopropyl carbonate. Among these, dialkyl peroxides are preferred. One alone or two or more kinds of these may be used either singly or as combined.

Specific examples of commercial products of these organic peroxides include "Perhexyne 25B", "Perbutyl D", "Perbutyl C", "Perhexa 25B", "Percumyl D", "Perbutyl P", "Perbutyl H", "Perhexyl H", "Percumyl H", "Perocta H", "Percumyl P", "Permentha H", "Perbutyl SM", "Permek N", "Peromer AC", "Perhexa V", "Perhexa 22", "Perhexa CD", "Pertetra A", "Perhexa C", "Perhexa 3M", "Perhexa HC", "Perhexa TMH", "Perbutyl IF", "Perbutyl Z", "Perbutyl A", "Perhexyl Z", "Perhexa 25Z", "Perbutyl E", "Perbutyl L", "Perhexa 25MT", "Perbutyl I", "Perbutyl 355", "Perbutyl MA", "Perhexyl I", "Perbutyl IB", "Perbutyl O", "Perhexyl O", "Percyclo O", "Perhexa 250", "Perocta O", "Perbutyl PV", "Perhexyl PV", "Perbutyl ND", "Perhexyl ND", "Percyclo ND", "Perocta ND", "Percumyl ND", "Daiper ND", "Peroyl SOP", "Peroyl OPP", "Peroyl MBP", "Peroyl EEP", "Peroyl IPP", "Peroyl NPP", "Peroyl TCP", "Peroyl IB", "Peroyl SA", "Peroyl S", "Peroyl O", "Peroyl L", "Peroyl 355", "Niper BW", "Niper BMT", and "Niper CS" by NOF corporation; and "Trigonox (registered trademark) 301" by Kayaku Nouryon Corporation (all trade names).

Examples of the hydroxylamine derivative include hydroxylamine compounds such as [9-(acetyloxy)-3,8,10-triethyl-7,8,10-trimethyl-1,5-dioxa-9-azaspiro[5,5]undec-3-yl]methyl octadecanoate.

Specific examples of commercial products of the hydroxylamine derivative include "Irgatec (registered trademark) CR 76 IC" by BASF SE.

Not specifically limited, the radical generator (B) can be appropriately selected in accordance with the desired properties of the modified polypropylene-based resin, and for example, in the case where those having a half-life period, such as peroxides, are used, preferably, one whose one-minute half-life temperature is not lower than the melting point of the starting material, polypropylene-based resin is selected. Here, the "one-minute half-life temperature" means a temperature at which the radical generator decomposes to be a half of the original amount thereof within one minute.

In use, the radical generator (B) may be diluted with water, an inert solvent, an emulsion of an inert inorganic compound, or a resin powder. Specific examples of the inert solvent include octane, decane, xylene, and silicone oil. The inert inorganic compound includes silica gel, alumina, calcium carbonate, and aluminum hydroxide. By such dilution, the dangerousness of the radical generator (B) can be reduced.

The content of the radical generator (B) in the polypropylene-based adhesive is, from the viewpoint of viscosity control, preferably 0.001 parts by mass or more relative to 100 parts by mass of the polypropylene-based resin (A), more preferably 0.01 parts by mass or more, even more preferably 0.05 parts by mass or more, further more preferably 0.1 parts by mass or more, further more preferably 0.2 parts by mass or more, and is preferably 5 parts by mass or less, more preferably 3 parts by mass or less, even more preferably 2 parts by mass or less, further more preferably 1 part by mass or less, further more preferably 0.5 parts by mass or less.

In reducing the weight-average molecular weight of the polypropylene-based resin (A) by decomposition, radicals may be generated by irradiation with an ionizing radiation along with or in place of using the radical generator (B).

The ionizing radiation includes an α ray, a ß ray, a γ ray, an X ray, and an electron beam, and from the viewpoint of easiness in cutting polymer chains, a γ ray and an electron beam are preferred, and an electron beam is most preferred in practical use. The irradiation dose with the ionizing radiation is not specifically defined. In the case of a γ ray, the irradiation dose therewith is about $2.6 \times 10^{-2}$ to $2.6 \times 10^2$ C·kg$^{-1}$/h or so, and in the case of an electron beam, the irradiation dose may be 500 times or more the dose with a γ ray. An electron beam enables irradiation at a high dose, and is therefore economically favorable since a large amount of a modified polypropylene-based resin can be obtained within a short period of time. In irradiation of the polypropylene-based resin (A) with such an ionizing radiation, the absorption dose is, from the viewpoint of easiness in cutting polymer chains, preferably within a range of 0.1 to 20 kGy, more preferably 0.2 to 15 kGy, most preferably 0.5 to 10 kGy. Here, in general, (Gy) is defined as the amount of the ionizing radiation that brings about energy absorption of 1 J per kg of the irradiated object irrespective of the radiation source. In the present invention, the absorption dose of the polypropylene-based resin (A) is not directly measured, but means to be equivalent to the dose absorbed, measured and indicated by a known ordinary dosimeter put on the surface of the irradiated mixture.

The temperature in irradiation of the polypropylene-based resin (A) with an ionizing radiation is, from the viewpoint of easiness in cutting polymer chains, preferably within a range of −10 to 80° C., more preferably −5 to 60° C., even more preferably 0 to 50° C. Regarding the atmosphere in irradiation, air may be employed, but from the viewpoint of readily controlling the intrinsic viscosity of the resultant modified polypropylene-based resin and increasing the melt tension thereof, more preferably, an inert gas atmosphere, for example, a nitrogen atmosphere is employed in irradiation.

In the case where an ionizing radiation is used as the radical generator (B), the polypropylene-based resin (A) is irradiated with an ionizing radiation, and before irradiation, the resin may be melt-kneaded, then further cut into granules and pelletized, and then the resultant pellets may be irradiated with an ionizing radiation.

Another means of generating radicals includes heating. Regarding the heating condition, from the viewpoint of easiness in cutting polymer chains, the heating temperature is preferably 150° C. or higher, more preferably 200° C. or higher, even more preferably 250° C. or higher.

(Tackifier Resin (C))

The resin composition of this embodiment may further contain a tackifier resin (C).

Examples of the tackifier resin include hydrogenated derivatives of aliphatic hydrocarbon petroleum resins, rosin derivative resins, polyterpene resins, petroleum resins, and oil-soluble phenolic resins that are solid, semisolid or liquid at room temperature. One alone or two or more kinds of these may be used either singly or as combined. In the present invention, hydrogenates are preferably used in consideration of the miscibility thereof with a base polymer. Above all, petroleum resin hydrides excellent in heat stability are more preferred.

Commercial products of tackifier resins are mentioned below.

Tackifier resins produced using a raw material obtained in a process of crude oil and naphtha purification include "Imarv" (by Idemitsu Kosan Co., Ltd.), "Alkon" (by Arakawa Chemical Industries, Ltd.), "Quinton" (by Zeon Corporation), "T-REZ" (by ENEOS Corporation), "Escorez" and "Oppera" (both by Exxon Mobil Chemical Corporation), "Eastotac", "Regalite", "Regalrez" and "Plastolyn" (all by Eastman Chemical Corporation), "Sukolez" (by Kolon Industries Inc.) and "Wingtack" and "Norsolene" (both by Cray Valley SA) (all trade names).

Tackifier resins produced using a raw material of an essential oil obtained from oranges and the like include "Clearon" (by Yasuhara Chemical Co., Ltd.), and "Sylvalite" and "Sylvares" (by Arizona Chemical Co., Ltd.) (all trade names).

Tackifier resins produced using a raw material of rosin or the like include "Haritack" and "Neotall" (by Harima Chemicals Group, Inc.), and "Ester Gum" and "Pensel" (by Arakawa Chemical Industries, Ltd.) (all trade names).

The content of the tackifier resin (C) in the resin composition of this embodiment is, from the viewpoint of tackiness enhancement, coating performance and wettability enhancement to adherends owing to viscosity reduction, preferably 0 part by mass or more relative to 100 parts by mass of the polypropylene-based resin (A), more preferably 1 part by mass or more, even more preferably 5 parts by mass or more, further more preferably 10 parts by mass or more, further more preferably 20 parts by mass or more, and is preferably 400 parts by mass or less, more preferably 200 parts by mass or less, even more preferably 150 parts by mass or less, further more preferably 100 parts by mass or less.

The softening point of the tackifier resin (C) is, though not specifically limited thereto but from the viewpoint of tackifier performance, preferably 80° C. or higher, more preferably 85° C. or higher, even more preferably 90° C. or higher, and is preferably 150° C. or lower, more preferably 130° C. or lower, even more preferably 110° C. or lower.

(Oil (D))

The resin composition of this embodiment may further contain an oil (D).

Not specifically limited, examples of the oil (D) include a mineral oil such as a paraffinic process oil, a naphthenic process oil and an isoparaffinic oil; an aromatic, mineral oil-based hydrocarbon; a synthetic resin-based hydrocarbon such as a low-molecular substance such as ethylene-propylene copolymer, polybutene, polybutadiene, and poly(α-olefin); an aliphatic oil-based softener such as alkylbenzene, castor oil, linseed oil, rape seed oil and coconut oil; and an ester plasticizer such as dibutyl phthalate, dioctyl phthalate, dioctyl adipate, and dioctyl sebacate. Above all, a mineral oil-based hydrocarbon, a paraffinic process oil, and a naphthenic process oil are preferably used. In particular, a paraffinic oil in which the carbon number of the paraffinic hydrocarbon accounts for 50% of the total carbon number is preferred.

Commercial products of the oil (D) include "Diana Process Oil PW" and "Diana Process Oil PS" by Idemitsu Kosan Co., Ltd.; "AP/E Core" and "SpectraSyn" by Exxon Mobil Corporation; "Lucant" by Mitsui Chemicals, Inc.; "Synfluid" by Chevron Corporation; "Kaydol Oil" by Chevron USA; "Licocene PPA 330 TP" by Clariant Corporation; and "Durasyn" by INEOS Corporation (all trade names).

The content of the oil (D) in the resin composition of this embodiment is, from the viewpoint of tackiness enhancement, coating performance and wettability enhancement to adherends owing to viscosity reduction, preferably 0 part by mass or more relative to 100 parts by mass of the polypropylene-based resin (A), more preferably 5 parts by mass or more, even more preferably 10 parts by mass or more, and is preferably 200 parts by mass or less, more preferably 100% by mass or less, even more preferably 50 parts by mass or less.

(Wax (E))

The resin composition of this embodiment may further contain a wax (E).

Examples of the wax include an animal wax, a vegetable wax, a carnauba wax, a candelilla wax, a Japan tallow, a bees wax, a mineral wax, a petroleum wax, a paraffin wax, a microcrystalline wax, a petrolatum, a higher fatty acid wax, a higher fatty acid ester wax, and a Fischer Tropsch wax.

The content of the wax (E) in the resin composition of the present invention is, from the viewpoint of improving coating performance, preferably 50 parts by mass or less relative to 100 parts by mass of the polypropylene-based resin (A), more preferably 30 parts by mass or less, and the resin composition may not contain the wax, that is, the content is preferably 0 part by mass or more, more preferably 10 parts by mass or more.

<Additives>

Additives generally used for polyolefins can be used in the polypropylene-based adhesive of the present invention. Additives are used for the purpose of improving moldability of thermoplastic resin, improving physical properties thereof, modifying the resin, imparting functionality thereto, and stabilizing the resin, and are not specifically limited. Preferably, for example, the additive is at least one selected from a moldability improver, a physicality improver, a functionality imparting agent, and a stabilizer.

The moldability improver includes a viscosity regulator (a thickening agent, a viscosity reducer), a plasticizer, a crystal nucleating agent, a crystallization speed regulator, a lubricant, and a mold release agent. The physicality improver includes a strength improver, a crosslinking agent, a decomposing agent, a softener, a flame retardant, a flame retardation aid, a coupling agent, a photosensitizing agent, a photopolymerization initiator, and a curing agent. The functionality imparting agent includes a slip agent, an antifogging agent, an electroconductive agent, an antistatic agent, a thermal conductive agent, a foaming agent, a colorant (dye, pigment), a fluorescent agent, a fragrance, a deodorizing agent, a surfactant, an insect repellent, an insecticide, and an antibacterial/antifungal agent. The stabilizer includes an antioxidant, an antiaging agent, a weather-resistant agent, a light stabilizer, a decomposition inhibitor for inhibiting main chain cleavage by heat or hydrolysis, and an antibacterial agent. One alone or two or more kinds of these additives may be used either singly or as combined.

Examples of the crystal nucleating agent include phosphate ester metal salts, benzoic acid metal salts, pimellic acid metal salts, rosin metal salts, benzylidene sorbitol, quinacridone, cyanine blue, and talc. Commercial products thereof include "Adekastab NA" series (by ADEKA Corporation), "Gelol" series (by New Japan Chemical Co., Ltd.), "RiKAFAST" series (by New Japan Chemical Co., Ltd.), "IRGACLEAR" by (BASF SE), "Millad" series (by Milliken Chemical Japan), and "Hyperform" series (by Milliken Chemical Japan).

A thermoplastic resin and a thermosetting resin may be blended in the polypropylene-based adhesive of the present invention, within a range not detracting from the advantageous effects of the invention. Examples of the thermoplastic resin include general polyethylene-based resins, polypropylene-based resins, polystyrene-based resins, syndiotactic polystyrene-based resins, modified polyphenylene ether-based resins, polyacetal-based resins, polyolefin-based resins, cyclic polyolefin-based resins, polyacryl-based resins, polycarbonate-based resins, polyamide-based resins, polysulfone-based resins, cellulose-based resins, polyester-based resins, (meth)acrylate-styrene copolymer resins, vinyl acetate resins, ethylene-vinyl acetate copolymer resins, ABS resins, styrene-based elastomer resins, ethylene-propylene-diene copolymer resins, polybutadienes, natural rubbers, synthetic rubbers, polyvinyl butyrate resins, vinyl chloride resins, silicone resins, phenol resins, urea resins, melamine resins, super-engineering plastics (polyphenylene sulfides and liquid-crystal polymers), rosin and derivatives thereof, terpene resins, terpene-phenol resins, aromatic modified terpene resins, hydrogenated terpene resins, aliphatic petroleum resins, aromatic petroleum resins, copolymer petroleum resins, alicyclic petroleum resins, hydrogenated petroleum resins, and alkylphenol resins.

<Production Method for Adhesive>

A method for producing the polypropylene-based adhesive of the present invention includes a step of producing a polypropylene-based resin (A') by reducing the weight-average molecular weight of a polypropylene-based resin (A) by decomposing the polypropylene-based resin (A) in the presence of a radical generator (B).

One preferred embodiment of the method includes a step (i) of adding a radical generator (B) to a polypropylene-based resin (A) to reduce the weight-average molecular weight of the polypropylene-based resin (A) to thereby give a polypropylene-based resin (A'), and a step (ii) of adding one or more selected from the group of a tackifier resin (C), an oil (D), a wax (E) and any other additive to the polypropylene-based resin (A'), but the present invention is not limited thereto.

In the case where the polypropylene-based resin (A) is used as an adhesive as it is, without adding the other additive than the radical generator (B) thereto, the step (ii) is unnecessary.

In the step (i), along with adding the radical generator (B) to the polypropylene-based resin (A), or in place of adding it, the resin may be irradiated with an ionizing radiation or may be heated to generate radicals. Specifically, the method of reducing the weight-average molecular weight of the polypropylene-based resin (A) is preferably at least one method selected from adding a radical generator (B), heating and irradiation with an ionizing radiation.

The step (i) and the step (ii) may be carried out at the same time, or may be carried out in a reversed order, or each step may be divided into plural stages to be carried out at different timings (for example, an oil (D) is added to the polypropylene-based resin (A), then a radical generator (B) is added, and thereafter a tackifier resin (C) is added).

These steps may be carried out in a batchwise kneading mode, or may be carried out in a continuous process using an extruder or the like.

Stirring in the step (i) may be carried out using an ordinary mixing device such as a batch-type kiln, or a tumbler mixer, or a Henschel mixer.

From the viewpoint of handleability, the polypropylene-based resin (A) is preferably solid. However, the resin is not limited to be a complete solid, but may be a gel. Regarding the shape thereof, the polypropylene-based resin (A) is, from the viewpoint of handleability, preferably pellets or flakes, more preferably pellets.

The reaction time in the step (i) is, from the viewpoint of productivity, preferably 5 minutes to 6 hours, more preferably 30 minutes to 2 hours.

The adhesive obtained according to the method including the step (i) and the step (ii) can be used in various purposes directly as it is, without being solidified after preparation, or may be once solidified and may be again heated in use in various purposes.

The polypropylene-based adhesive of the present invention can be favorably used for sanitary materials, for book-making, for fibers, for can-making, for filters, for low-pressure molding, and for bag-making. Specifically, the adhesive can be favorably used in a packaging field (cartons, corrugated boards, cushioning fixation, repairing of paper cup automatic packing lines, sample fixation, packaging after unpacking for packing check, desiccant packing in food packages), for electric materials (electronic parts fixation on C boards, reinforcing temporary joint, anti-vibration reinforcing, vacant space filling in connectors, substrate board insulation, wire fixation, encapsulation), for film adhesion, for slip resistance (film coating for DM), for houses, for building materials (sidings, tiles, floor materials, carpets, cloths, wallpapers, sample adhesion), for constructions and interiors (adhesion of heat-insulating foams, kitchen waterproof sheets, snagging prevention in cutting tatami matting, roofs, balcony FRP, cracks, tiles), for furniture and woodworking (tables, chairs, sofas, beds, mirror stand cabinets, reinforcing material fixation, cloth adhesion, frill fixation, Buddhist altars, bindings), for hobbies, adhesion of small articles, accessories and traditional crafts, for automobile industries (adhesion of dashboard anti-vibration reinforcing materials, adhesion of heads and lamp cases, door interior materials, heat-insulating, sound-insulating and anti-vibration materials, filters, temporary joints in assembly lines), for sanitary materials (assembly of diapers and menstrual sanitary products), for medical cares (assembly of sheets, operating gowns, and masks), for textile lamination, for assembly of automobile floor mats, as well as for sanitary materials such as typically for fixation of nonwoven fabrics or superabsorbent polymers (SAP). One preferred embodiment of the present invention is a laminate containing the polypropylene-based adhesive of the present invention. Another preferred embodiment of the present invention is a nonwoven fabric containing the polypropylene-based adhesive of the present invention. Preferred embodiments of the present invention are not limited to these.

The polypropylene-based resin (A') of the present invention, as prepared by reducing the weight-average molecular weight of a polypropylene-based resin (A) by decomposition, can be used not only for adhesives but also for raw materials for forming, for example, melt-blown nonwoven fabrics.

EXAMPLES

Next, the present invention will be described in more detail with reference to Examples, but the present invention is by no means limited to these Examples.

The raw materials used in Experimental Examples and Comparative Examples are as follows.
<Polypropylene-Based Resin (A)>

A1: "L-MODU S400" by Idemitsu Kosan Co., Ltd., melting endotherm ($\Delta$H-D)=36 J/g, melting point (Tm-D)=80° C., weight-average molecular weight (Mw)=45,000, molecular weight distribution (Mw/Mn)=2.0, viscosity=8,500 mPa·s, polypropylene-based resin produced with metallocene catalyst.

Physical properties of the polypropylene-based resin (A) were measured according to the methods mentioned below.
[DSC Measurement]

Using a differential scanning calorimeter (by Perkin Elmer Inc., DSC-7), 10 mg of a sample was kept in a nitrogen atmosphere at −10° C. for 5 minutes, and then heated at 10°/min. From the resultant melting endothermic curve, the melting endotherm ($\Delta$H-D) was determined. In addition, from the peak top of the peak observed on the highest temperature side of the resultant melting endothermic curve, the melting point (Tm-D) was determined.

The melting endotherm ($\Delta$H-D) is calculated as follows. A line drawn by connecting a point on the low-temperature side with no heat quantity change and a point on the high-temperature side with no heat quantity change is referred to as a baseline, and the area surrounded by the baseline and a line part including peaks of the melting endothermic curve drawn through DSC using a differential scanning calorimeter (DSC-7, by Perkin Elmer, Inc.) is calculated to determine the melting endotherm.
[Measurement of Weight-Average Molecular Weight (Mw) and Molecular Weight Distribution (Mw/Mn)]

The weight-average molecular weight (Mw), the Z-average molecular weight (Mz) and the number-average molecular weight (Mn) were measured through gel permeation chromatography (GPC), and the molecular weight distribution (Mw/Mn) and the ratio of the Z-average molecular weight Mz to the weight-average molecular weight Mw (Mz/Mw) were determined. In the measurement, the following device was used under the following condition, and the polystyrene-equivalent, weight-average molecular weight, Z-average molecular weight and number-average molecular weight were measured. The molecular weight distribution (Mw/Mn) is calculated from these weight-average molecular weight (Mw) and number-average molecular weight (Mn), and Mz/Mw is a value calculated from the Z-average molecular weight (Mz) and the weight-average molecular weight (Mw). In addition, the monomer-average molecular weight (M) was also determined in the same manner.
<GPC Measuring Device>

Column: "TOSO GMHHR-H(S)HT" by Tosoh Corporation

Detector: RI detector for liquid chromatography, "Waters 150C" by Waters Corporation <Measurement Condition>
  Solvent: 1,2,4-trichlorobenzene
  Measurement temperature: 145° C.
  Flow rate: 1.0 mL/min
  Sample concentration: 5 mg/10 mL
  Injection amount: 300 μL
  Calibration curve: Universal Calibration
  Analysis software: HT-GPC (ver. 1.0)

[Viscosity Measurement]

According to ASTM D3236, the viscosity was measured using a Brookfield rotary viscometer at 190° C.

<Radical Generator (B)>
  B1: "Perbutyl H" by NOF Corporation, tertiary butyl cumyl peroxide
  B2: "Trigonox (registered trademark) 301-10PP" by Kayaku Nouryon Corporation, prepared by immersing 10% by mass of "Trigonox (registered trademark) 301" by Kayaku Nouryon Corporation in polypropylene powder, cyclic dialkyl peroxide.
  B3: "Irgatec (registered trademark) CR 76 IC" by BASF SE, prepared by compounding 10% by mass of hindered hydroxylamine ester with polypropylene powder.

<Tackifier Resin (C)>
  C1: "Imarv P-100" by Idemitsu Kosan Co., Ltd., a hydrogenated petroleum resin.

<Oil (D)>
  D1: "PW-90", by Idemitsu Kosan Co., Ltd., paraffin oil

<Other>
  Antioxidant: "Irganox 1010" by BASF SE, tetrakis[3-(4-hydroxy-3,5-di-tert-butylphenyl)propanoic acid](methanetetrayl-tetrakismethylene).

Example 1

The polypropylene-based resin (A1), the radical generator (B1), the tackifier resin (C1) and the oil (D1) were put into a stirrer-equipped stainless reactor (inner volume 500 mL) in the blending ratio shown in Table 1, and stirred in a nitrogen stream atmosphere for 30 minutes.

The stirring was stopped, and using a mantle heater, the resin temperature was elevated up to 230° C. After stirred for 5 minutes, the mantle heater was controlled so that the resin temperature could be constant at 150° C., and then the antioxidant was added in an amount corresponding to 2000 ppm relative to the total, 100 parts by mass, of polypropylene-based resin (A1), the radical generator (B1), the tackifier resin (C1) and the oil (D1), and stirred for 10 minutes, and thereafter the contents were taken out into a vat coated with Teflon (registered trademark) to give a hot-melt adhesive.

Comparative Example 1

An adhesive was produced according to the same process as above except that the radical generator (B1) was not added in Example 1.

Example 2

An adhesive was produced according to the same process as in Example 1 except that the tackifier resin (C1) and the oil (D1) were not added in Example 1.

Comparative Example 2

An adhesive was produced according to the same process as in Example 1 except that the radical generator (B1), the tackifier resin (C1) and the oil (D1) were not added in Example 1.

Examples 3 to 8

Constituent components were melt-kneaded using a twin-screw kneading extruder (TEM18SS, by Shibaura Machine Co., Ltd.) at barrel temperatures of C1: 100° C., C2: 150° C., and C3 to H preset as in Table 1 and at a screw rotation number and the injection amount shown in Table 1 to give hot-melt adhesives. The polypropylene-based resin (A) and the radical generator (B) were all fed in a top-feed mode to be in the formulation ratio shown in Table 1.

Comparative Example 3

An adhesive was produced according to the same process as in Example 3 except that the radical generator (B) was not added in Example 3.

The adhesives produced in Examples 1 to 8 and Comparative Examples 1 to 3 were evaluated as follows. The results are shown in Table 1.

[Vinylidene Group as Terminal Unsaturated Group Contained in One Molecule]

Based on the terminal vinylidene group appearing at 64.8 to 4.6 (2H) in $^1$H-NMR measurement, the content of the terminal vinylidene group (C) (mol %) was calculated according to an ordinary method. Further, from the number-average molecular weight (Mn) and the monomer molecular weight (M) determined through gel permeation chromatography (GPC), the number of the terminal vinylidene group per molecule was calculated according to the following expression.

$$\text{Number of terminal vinylidene group per molecule} = (Mn/M) \times (C/100)$$

In calculating the content of the terminal vinylidene group (C) (mol %), <1> a methylene group of the terminal vinyl group (5.10 to 4.90 ppm), <2> a methylene group of the terminal vinylidene group (4.8 to 4.6 ppm) and <3> methine, methylene and methyl groups of the propylene chain (0.6 to 2.3 ppm) were observed, and the content was calculated according to the following expression.

$$\text{Content of terminal vinylidene group } (C) \text{ (mol \%)} = (<2>/2)/[(<3>+4\times<1>/2+3\times<2>/2)/6] \times 100$$

[T-Peel Strength Measurement]

The T-peel strength is an index to indicate a strength of adhesion force, and a sample having a higher strength is more unpeelable and is favorable.

A predetermined amount of the hot-melt adhesive produced in Examples 1 to 2 or Comparative Examples 1 to 2 was applied under the following condition to bond nonwoven fabrics (NW), and the resultant, bonded sample was cut in the direction vertical to the substrate traveling direction (that is, in the cross direction, CD) at intervals of 25 mm width to prepare test pieces.

Spiral Spray Gun: Universal applicator and universal CF nozzle (nozzle diameter, about 0.5 mm<φ) by Nordson Corporation.
  Line speed: 150 m/min
  Coating amount: 5 g/m$^2$
  Spiral diameter: 15 mm
  Coating temperature: 150° C.

Bonding pressure: 0.1 MPa

The test pieces prepared as above were tested to measure the T-peel strength thereof. The measurement environment was at 23° C. and 50% RH, and the peeling speed was 100 mm/min. Two maximum values were averaged to give an average value for the peel strength.

evaluate the presence of absence of stringiness of the adhesive. Regarding the property of the adhesive, absence of stringiness is preferred.

[Viscosity Measurement]

According to ASTM D3236, the viscosity was measured using a Brookfield rotary viscometer at 190° C.

TABLE 1

| | | | Comparative Example | Example | Comparative Example | Example | Example | | | | | | Comparative Example |
|---|---|---|---|---|---|---|---|---|---|---|---|---|---|
| | | | 1 | 1 | 2 | 2 | 3 | 4 | 5 | 6 | 7 | 8 | 3 |
| Polypropylene-based Resin (A) | A1 | part by mass | 100 | 100 | 100 | 100 | 100 | 100 | 100 | 100 | 100 | 100 | 100 |
| Radical Generator (B) | B1 | part by mass | 0.9 | — | 0.9 | — | — | — | — | — | — | — | — |
| | B2 | part by mass | — | — | — | — | 2 | 2 | 2 | 2 | — | — | — |
| | B3 | part by mass | — | — | — | — | — | — | — | — | 2 | 2 | — |
| Tackifier Resin (C) | C1 | part by mass | 50 | 50 | — | — | — | — | — | — | — | — | — |
| Oil (D) | D1 | part by mass | 16.5 | 16.5 | — | — | — | — | — | — | — | — | — |
| Antioxidant | | ppm by mass (*1) | 2,000 | 2,000 | 2,000 | 2,000 | — | — | — | — | — | — | — |
| Preset Temperature of Extruder | | °C. | — | — | — | — | 230 | 230 | 250 | 250 | 250 | 250 | 250 |
| Discharge Rate | | kg/h | — | — | — | — | 2.5 | 5 | 2.5 | 10 | 2.5 | 5 | 2.5 |
| Screw Rotation Number | | rpm | — | — | — | — | 100 | 200 | 100 | 200 | 100 | 200 | 100 |
| Number of Vinylidene Group as Terminal Unsaturated Group per Molecule | | number/molecule | 1.1 | 0.8 | 1.1 | 0.8 | 1.2 | 1.1 | 1.3 | 1.2 | 1.2 | 1.1 | 0.8 |
| NW/NW: Initial T-Peel | | gf | 500 | 450 | — | — | — | — | — | — | — | — | — |
| NW/NW: Aging T-Peel | | gf | 550 | 500 | — | — | — | — | — | — | — | — | — |
| NW/NW: Peeling Confirmation in 2 minutes after bonding | | | — | — | *2 | *3 | — | — | — | — | — | — | — |
| Coatable Temperature | | °C. | 120 | 140 | 150 | 180 | — | — | — | — | — | — | — |
| Stringiness | | | — | no | yes | — | — | — | — | — | — | — | — |
| Viscosity @190° C. | | mPa · s | 3500 | 5000 | 4000 | 8500 | 4900 | 6700 | 2800 | 4400 | 4500 | 6500 | 8400 |

*1: Content relative to the total, 100 parts by mass, of the polypropylene-based resin (A), the radical generator (B), the tackifier resin (C) and the oil (D).
*2: Material failure (nonwoven fabrics broken).
*3: Cohesion failure (adhesive broken).

The value of the sample kept at room temperature (23° C.) for 24 hours after coating was referred to as "initial TP-Peel", and the value of the sample stored at 50° C. for 2 weeks and further kept at room temperature for 24 hours was referred to as "aging T-Peel". In addition, the test piece in 2 minutes after coating was peeled and checked for the condition. Those in which the adhesive was broken were judged as "cohesion failure", and those in which the base fabric and not the adhesive was broken were judged as "material failure".

[Coating Performance Evaluation]

According to the same method as in T-Peel strength measurement, a predetermined amount of the hot-melt adhesive produced in Examples 1 to 2 or Comparative Examples 1 to 2 was applied. At that time, the coating temperature was stepwise lowered by 5° C., and the lowest coating temperature at which a spiral diameter of 15 mm could be kept in a stable form at an appropriately controlled air flow rate was measured to evaluate the coating performance of the adhesive. A lower coating temperature means that the tested adhesive has better coating performance.

[Stringiness Evaluation]

According to the same method as in T-Peel strength measurement, a predetermined amount of the hot-melt adhesive produced in Example 1 or Comparative Example 1 was applied, and during the process, the adhesive application was stopped. Immediately after stopping the adhesive application, the tip of the nozzle was checked for dripping to From Table 1, it is known that, in Examples, the viscosity of the whole adhesive lowered by addition of the radical generator and the coating performance of the adhesive improved. As an optional advantage, it is known that, as a result of enhancement of the penetrability of the adhesive into nonwoven fabrics, the initial adhesion strength improved. Further, as another optional advantage, it is known that the adhesive is free from stringiness owing to viscosity reduction. With those, as still another optional advantage, it is known that the viscosity of the resultant adhesive can be controlled by changing the setups in extrusion.

The invention claimed is:

1. A polypropylene-based adhesive, comprising:
   a polypropylene-based resin (A') prepared by reducing a weight-average molecular weight of a polypropylene-based resin (A) by decomposition, in which a melting endotherm (ΔH-D) of the polypropylene-based resin (A) is 5 J/g or more and 80 J/g or less, as obtained from a melting endothermic curve drawn by holding a sample at −10° C. for 5 minutes in a nitrogen atmosphere followed by heating the sample at 10° C./min using a differential scanning calorimeter (DSC),
   wherein
   the polypropylene-based resin (A') has a vinylidene group as a terminal unsaturated group contained per molecule of the polypropylene-based resin (A') of 0.9 or more and 2.0 or less, the polypropylene-based resin (A) has a melting point (Tm-D) of 20° C. or higher and 120° C. or lower, and the polypropylene-based adhesive comprises a radical generator (B) in an amount of 0.01 parts by mass or more and 5 parts by mass or less relative to 100 parts by mass of the polypropylene-based resin (A).

2. The polypropylene-based adhesive according to claim 1, wherein the weight-average molecular weight (Mw) of the polypropylene-based resin (A) is 150,000 or less.

3. The polypropylene-based adhesive according to claim 1, wherein the polypropylene-based resin (A) has a viscosity of 400,000 mPa·s or less, as measured with a B viscosity viscometer.

4. The polypropylene-based adhesive according to claim 1, wherein the polypropylene-based resin (A) has a molecular weight distribution (Mw/Mn) of 4.0 or less.

5. The polypropylene-based adhesive according to claim 1, wherein the polypropylene-based resin (A) is a propylene homopolymer.

6. The polypropylene-based adhesive according to claim 1, further comprising:
a tackifier resin (C) in an amount of 0 part by mass or more and 400 parts by mass or less relative to 100 parts by mass of the polypropylene-based resin (A).

7. The polypropylene-based adhesive according to claim 1, further comprising:
an oil (D) in an amount of 0 part by mass or more and 100 parts by mass or less relative to 100 parts by mass of the polypropylene-based resin (A).

8. The polypropylene-based adhesive according to claim 1, further comprising:
a wax (E) in an amount of 0 part by mass or more and 50 parts by mass or less relative to 100 parts by mass of the polypropylene-based resin (A).

9. A laminate, comprising:
the polypropylene-based adhesive of claim 1.

10. A nonwoven fabric, comprising:
the polypropylene-based adhesive of claim 1.

11. A method for producing a polypropylene-based adhesive, the method comprising: reducing a weight-average molecular weight of a polypropylene-based resin (A); and decomposing the polypropylene-based resin (A) in the presence of a radical generator (B), thereby producing a polypropylene-based resin (A'), wherein a melting endotherm ($\Delta$Hm-D) of the polypropylene-based resin (A) is 5 J/g or more and 80 J/g or less, as obtained from a melting endothermic curve drawn by holding a sample at $-10°$ C. for 5 minutes in a nitrogen atmosphere followed by heating the sample at 10° C./min using a differential scanning calorimeter (DSC), the polypropylene-based resin (A) has a melting point (Tm-D) of 20° C. or higher and 120° C. or lower, the polypropylene-based adhesive comprises a radical generator (B) in an amount of 0.01 parts by mass or more and 5 parts by mass or less relative to 100 parts by mass of the polypropylene-based resin (A), and the polpropylene-based resin (A') has a vinylidene group as a terminal unsaturated group contained per molecule of the polypropylene-based resin (A') of 0.9 or more and 2.0 or less.

12. The method according to claim 11,
wherein the reducing is carried out by at least one method selected from the group consisting of adding a radical generator (B), heating and irradiating with radiation.

* * * * *